US008766989B2

(12) United States Patent
Wyatt et al.

(10) Patent No.: US 8,766,989 B2
(45) Date of Patent: Jul. 1, 2014

(54) METHOD AND SYSTEM FOR DYNAMICALLY ADDING AND REMOVING DISPLAY MODES COORDINATED ACROSS MULTIPLE GRAPHICS PROCESSING UNITS

(75) Inventors: David Wyatt, San Jose, CA (US); Linda Glanville, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 1082 days.

(21) Appl. No.: 12/511,434

(22) Filed: Jul. 29, 2009

(65) Prior Publication Data

US 2011/0025696 A1 Feb. 3, 2011

(51) Int. Cl.
*G06F 13/14* (2006.01)
*G06F 15/16* (2006.01)
*G06F 15/80* (2006.01)

(52) U.S. Cl.
USPC ........... 345/520; 345/502; 345/503; 345/504; 345/505

(58) Field of Classification Search
USPC ......................................... 345/502–505, 520
See application file for complete search history.

(56) References Cited

U.S. PATENT DOCUMENTS 4,603,400 A 7/1986 Daniels
4,955,066 A 9/1990 Notenboom
5,016,001 A 5/1991 Minagawa et al.
5,321,510 A 6/1994 Childers et al.
5,371,847 A 12/1994 Hargrove
5,461,679 A 10/1995 Normile et al.
5,517,612 A 5/1996 Dwin et al.
5,687,334 A 11/1997 Davis et al.
5,712,995 A 1/1998 Cohn
5,768,164 A 6/1998 Hollon, Jr.
5,781,199 A 7/1998 Oniki et al.
5,841,435 A 11/1998 Dauerer et al.
5,878,264 A 3/1999 Ebrahim
5,900,913 A 5/1999 Tults
5,917,502 A 6/1999 Kirkland et al.
5,923,307 A 7/1999 Hogle, IV (Continued)

FOREIGN PATENT DOCUMENTS

WO 2005026918 3/2005

OTHER PUBLICATIONS

"Epson; EMP Monitor V4, 10 Operation Guide", by Seiko Epson Corp., 2006 http://support.epson.ru/products/manuals/100396/Manual/EMPMonitor.pdf.

(Continued)

*Primary Examiner* — Hau Nguyen

(57) ABSTRACT

The present invention provides a method and system for coordinating graphics processing units in a single computing system. A method is disclosed which allows for the construction of a list of shared display modes that may be employed by both of the graphics processing units to render an output in a display device. By creating the list of shared commonly supportable display modes, the output displayed in the display device may advantageously provide a consistent graphical experience persisting through the use of alternate graphics processing units in the system. One method builds a list of shared display modes by compiling a list from a GPU specific base mode list and dynamic display modes acquired from an attached display device. Another method provides the ability to generate graphical output configurations according to a user-selected display mode that persists when alternate graphics processing units in the system are used to generate graphical output.

14 Claims, 8 Drawing Sheets

100

(56) References Cited

U.S. PATENT DOCUMENTS

| | | | | |
|---|---|---|---|---|
| 5,978,042 | A | 11/1999 | Vaske et al. | |
| 6,008,809 | A | 12/1999 | Brooks | |
| 6,018,340 | A | 1/2000 | Butler et al. | |
| 6,025,853 | A | 2/2000 | Baldwin | |
| 6,075,531 | A | 6/2000 | DeStefano | |
| 6,078,339 | A | 6/2000 | Meinerth et al. | |
| 6,191,758 | B1 | 2/2001 | Lee | |
| 6,208,273 | B1 | 3/2001 | Dye et al. | |
| 6,226,237 | B1 | 5/2001 | Chan et al. | |
| 6,259,460 | B1 | 7/2001 | Gossett et al. | |
| 6,337,747 | B1 | 1/2002 | Rosenthal | |
| 6,359,624 | B1 | 3/2002 | Kunimatsu | |
| 6,388,671 | B1 | 5/2002 | Yoshizawa et al. | |
| 6,473,086 | B1 | 10/2002 | Morein et al. | |
| 6,480,198 | B2 | 11/2002 | Kang | |
| 6,483,502 | B2 | 11/2002 | Fujiwara | |
| 6,498,721 | B1 | 12/2002 | Kim | |
| 6,557,065 | B1 | 4/2003 | Peleg et al. | |
| 6,600,500 | B1 | 7/2003 | Yamamoto | |
| 6,628,243 | B1 | 9/2003 | Lyons et al. | |
| 6,630,943 | B1 | 10/2003 | Nason et al. | |
| 6,654,826 | B1 | 11/2003 | Cho et al. | |
| 6,657,632 | B2 | 12/2003 | Emmot et al. | |
| 6,724,403 | B1 | 4/2004 | Santoro et al. | |
| 6,753,878 | B1 | 6/2004 | Heirich et al. | |
| 6,774,912 | B1 | 8/2004 | Ahmed et al. | |
| 6,784,855 | B2 | 8/2004 | Matthews et al. | |
| 6,816,977 | B2 | 11/2004 | Brakmo et al. | |
| 6,832,269 | B2 | 12/2004 | Huang et al. | |
| 6,832,355 | B1 | 12/2004 | Duperrouzel et al. | |
| 6,956,542 | B2 | 10/2005 | Okuley et al. | |
| 7,007,070 | B1 | 2/2006 | Hickman | |
| 7,010,755 | B2 | 3/2006 | Anderson et al. | |
| 7,030,837 | B1 | 4/2006 | Vong et al. | |
| 7,034,776 | B1 | 4/2006 | Love | |
| 7,124,360 | B1 | 10/2006 | Drenttel et al. | |
| 7,129,909 | B1 * | 10/2006 | Dong et al. | 345/1.1 |
| 7,212,174 | B2 | 5/2007 | Johnston et al. | |
| 7,269,797 | B1 | 9/2007 | Bertocci et al. | |
| 7,359,998 | B2 | 4/2008 | Chan et al. | |
| 7,450,084 | B2 * | 11/2008 | Fuller et al. | 345/1.1 |
| 7,486,279 | B2 | 2/2009 | Wong et al. | |
| 7,509,444 | B2 | 3/2009 | Chiu et al. | |
| 7,552,391 | B2 | 6/2009 | Evans et al. | |
| 7,558,884 | B2 | 7/2009 | Fuller et al. | |
| 7,612,783 | B2 | 11/2009 | Koduri et al. | |
| 8,176,155 | B2 | 5/2012 | Yang et al. | |
| 2001/0028366 | A1 | 10/2001 | Ohki et al. | |
| 2002/0087225 | A1 | 7/2002 | Howard | |
| 2002/0128288 | A1 | 9/2002 | Kyle et al. | |
| 2002/0129288 | A1 | 9/2002 | Loh et al. | |
| 2002/0140627 | A1 | 10/2002 | Ohki et al. | |
| 2002/0163513 | A1 | 11/2002 | Tsuji | |
| 2002/0182980 | A1 | 12/2002 | Van Rompay | |
| 2002/0186257 | A1 | 12/2002 | Cadiz et al. | |
| 2003/0016205 | A1 | 1/2003 | Kawabata et al. | |
| 2003/0025689 | A1 | 2/2003 | Kim | |
| 2003/0041206 | A1 | 2/2003 | Dickie | |
| 2003/0065934 | A1 | 4/2003 | Angelo et al. | |
| 2003/0088800 | A1 | 5/2003 | Cai | |
| 2003/0090508 | A1 | 5/2003 | Keohane et al. | |
| 2003/0126335 | A1 | 7/2003 | Silvester | |
| 2003/0188144 | A1 | 10/2003 | Du et al. | |
| 2003/0189597 | A1 | 10/2003 | Anderson et al. | |
| 2003/0195950 | A1 | 10/2003 | Huang et al. | |
| 2003/0197739 | A1 | 10/2003 | Bauer | |
| 2003/0200435 | A1 | 10/2003 | England et al. | |
| 2003/0222876 | A1 | 12/2003 | Giemborek et al. | |
| 2004/0001069 | A1 | 1/2004 | Snyder et al. | |
| 2004/0019724 | A1 | 1/2004 | Singleton, Jr. et al. | |
| 2004/0027315 | A1 | 2/2004 | Senda et al. | |
| 2004/0080482 | A1 | 4/2004 | Magendanz et al. | |
| 2004/0085328 | A1 | 5/2004 | Maruyama et al. | |
| 2004/0184523 | A1 | 9/2004 | Dawson et al. | |
| 2004/0222978 | A1 | 11/2004 | Bear et al. | |
| 2004/0224638 | A1 | 11/2004 | Fadell et al. | |
| 2004/0225901 | A1 | 11/2004 | Bear et al. | |
| 2004/0225907 | A1 | 11/2004 | Jain et al. | |
| 2004/0235532 | A1 | 11/2004 | Matthews et al. | |
| 2004/0268004 | A1 | 12/2004 | Oakley | |
| 2005/0025071 | A1 | 2/2005 | Miyake et al. | |
| 2005/0059346 | A1 | 3/2005 | Gupta et al. | |
| 2005/0064911 | A1 | 3/2005 | Chen et al. | |
| 2005/0066209 | A1 | 3/2005 | Kee et al. | |
| 2005/0073515 | A1 | 4/2005 | Kee et al. | |
| 2005/0076088 | A1 | 4/2005 | Kee et al. | |
| 2005/0076256 | A1 | 4/2005 | Fleck et al. | |
| 2005/0097506 | A1 | 5/2005 | Heumesser | |
| 2005/0140566 | A1 | 6/2005 | Kim et al. | |
| 2005/0182980 | A1 | 8/2005 | Sutardja | |
| 2005/0240538 | A1 | 10/2005 | Ranganathan | |
| 2005/0262302 | A1 | 11/2005 | Fuller et al. | |
| 2006/0001595 | A1 | 1/2006 | Aoki | |
| 2006/0007051 | A1 | 1/2006 | Bear et al. | |
| 2006/0085760 | A1 | 4/2006 | Anderson et al. | |
| 2006/0095617 | A1 | 5/2006 | Hung | |
| 2006/0119537 | A1 | 6/2006 | Vong et al. | |
| 2006/0119538 | A1 | 6/2006 | Vong et al. | |
| 2006/0119602 | A1 | 6/2006 | Fisher et al. | |
| 2006/0125784 | A1 | 6/2006 | Jang et al. | |
| 2006/0129855 | A1 | 6/2006 | Rhoten et al. | |
| 2006/0130075 | A1 | 6/2006 | Rhoten et al. | |
| 2006/0150230 | A1 | 7/2006 | Chung et al. | |
| 2006/0164324 | A1 | 7/2006 | Polivy et al. | |
| 2006/0232494 | A1 | 10/2006 | Lund et al. | |
| 2006/0250320 | A1 | 11/2006 | Fuller et al. | |
| 2006/0267857 | A1 | 11/2006 | Zhang et al. | |
| 2006/0267987 | A1 | 11/2006 | Litchmanov | |
| 2006/0267992 | A1 | 11/2006 | Kelley et al. | |
| 2006/0282855 | A1 | 12/2006 | Margulis | |
| 2007/0046562 | A1 | 3/2007 | Polivy et al. | |
| 2007/0052615 | A1 | 3/2007 | Van Dongen et al. | |
| 2007/0067655 | A1 | 3/2007 | Shuster | |
| 2007/0079030 | A1 | 4/2007 | Okuley et al. | |
| 2007/0083785 | A1 | 4/2007 | Sutardja | |
| 2007/0103383 | A1 | 5/2007 | Sposato et al. | |
| 2007/0195007 | A1 | 8/2007 | Bear et al. | |
| 2007/0273699 | A1 | 11/2007 | Sasaki et al. | |
| 2008/0130543 | A1 | 6/2008 | Singh et al. | |
| 2008/0155478 | A1 | 6/2008 | Stross | |
| 2008/0172626 | A1 | 7/2008 | Wu | |
| 2008/0297433 | A1 | 12/2008 | Heller et al. | |
| 2008/0320321 | A1 | 12/2008 | Sutardja | |
| 2009/0021450 | A1 | 1/2009 | Heller et al. | |
| 2009/0031329 | A1 | 1/2009 | Kim | |
| 2009/0059496 | A1 | 3/2009 | Lee | |
| 2009/0160865 | A1 | 6/2009 | Grossman | |
| 2009/0172450 | A1 | 7/2009 | Wong et al. | |
| 2009/0193243 | A1 | 7/2009 | Ely | |
| 2010/0010653 | A1 | 1/2010 | Bear et al. | |
| 2010/0033433 | A1 | 2/2010 | Utz et al. | |
| 2010/0033916 | A1 | 2/2010 | Douglas et al. | |

OTHER PUBLICATIONS

"Virtual Network Computing", http://en.wikipedia.org/wiki/Vnc, Downloaded Circa: Dec. 18, 2008, pp. 1-4.

McFedries, ebook, titled "Complete Idiot's Guide to Windows XP", published Oct. 3, 2001, pp. 1-7.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.

Vulcan, Inc., "Product Features: Size and performance", p. 1; downloaded from the internet on Sep. 20, 2005 from http://www.flipstartpc.com/aboutproduct__features__sizeandpower.asp.

Vulcan, Inc., "Product Features:LID Module", p. 1, downloaded from the Internet on Sep. 19, 2005 from http://www.flipstartpc.com/aboutproduct__features__lidmodule.asp.

Vulcan, Inc., "Software FAQ", p. 1, downloaded from the internet on Sep. 20, 2005 from http://www.flipstartpc.com/faq__software.asp.

"System Management Bus (SMBus) Specification," Version 2.0, Aug. 3, 2000; pp. 1-59.

(56) References Cited

OTHER PUBLICATIONS

Handtops.com, "FlipStart PC in Detail" pp. 1-4, downloaded from the internet o Sep. 20, 2005 from http://www.handtops.com/show/news/5.
Microsoft Corporation, "Microsoft Windows Hardware Showcase", dated Apr. 28, 2005; pp. 1-5; downloaded from the internet on Sep. 15, 2005, from http://www.microsoft.com/whdc/winhec/hwshowcase05.mspx.
Paul Thurrot's SuperSite for Windows, "WinHEC 2004 Longhorn Prototypes Gallery", dated May 10, 2004, pp. 1-4, downloaded from the internet on Sep. 15, 2005 from http://www.sinwupersite.com/showcase.loghom_winhc_proto.asp.
Vulcan Inc., "Connectivity FAQ", p. 1, downloaded from the internet on Sep. 20, 2005 from http://www.flipstartpc.com/faq_connectivity.asp.
"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.html.
"Graphics: Intel® 82852/82855 Graphics Controller Family", Intel, Archived Nov. 2, 2006 by archive.org, Downloaded Jun. 30, 2011, http://web.archive.org/web/20061103045644/http://www.intel.com/support/graphics/intel852gm/sb/CS-009064.html.
"Epson: EMP Monitor V4.10 Operation Guide", by Seiko Epson Corp., 2006, http://support.epson.ru/products/manuals/100396/Manual/EMPMonitor.pdf.
"The Java Tutorial: How to Use Combo Boxes", Archived Mar. 5, 2006 by archive.org, Downloaded Jun. 30, 2011, http://web.archive.org/web/20050305000852/http://www-mips.unice.fr/Doc/Java/Tutorial/uiswing/components/combobox.html.
Andrew Fuller; "Auxiliary Display Platform in Longhorn"; Microsoft Corporation; The Microsoft Hardware Engineering Conference Apr. 25-27, 2005; slides 1-29.

* cited by examiner

100

300

| iGPU Timing | dGPU Timing | Result (enumerated to O/S) |
|---|---|---|
| 1. Supported | Supported | Supported |
| 2. Not Supported | Supported | Not Supported |
| 3. Not Supported | Not Supported | Not Supported |
| 4. Supported | Not Supported | Not Supported |

800

FIGURE 8

METHOD AND SYSTEM FOR DYNAMICALLY ADDING AND REMOVING DISPLAY MODES COORDINATED ACROSS MULTIPLE GRAPHICS PROCESSING UNITS

BACKGROUND

A graphics processing unit or "GPU" is a device used to perform graphics rendering operations in modern computing systems such as desktops, notebooks, and video game consoles, etc. Traditionally, graphics processing units are typically supplied as either integrated units or within discrete video cards.

Integrated graphics processing units are graphics processors that utilize a portion of a computer's system memory rather than having its own dedicated memory. Due to this arrangement, integrated GPUs are typically localized in close proximity to, if not disposed directly upon, some portion of the main circuit board (e.g., a motherboard) of the computing system. Integrated GPUs are, in general, cheaper to implement than discrete GPUs, but are typically lower in capability and operate at reduced performance levels relative to discrete GPUs.

Discrete or "dedicated" GPUs are distinguishable from integrated GPUs by having local memory dedicated for use by the GPU which they do not share with the underlying computer system. Commonly, discrete GPUs are implemented on discrete circuit boards called "video cards" which include, among other components, a GPU, the local memory, communication buses and various output terminals. These video cards typically interface with the main circuit board of a computing system through a standardized expansion slot such as PCI Express (PCIe) or Accelerated Graphics Port (AGP), upon which the video card may be mounted. In general, discrete GPUs are capable of significantly higher performance levels relative to integrated GPUs. However, discrete GPUs also typically require their own separate power inputs, and require higher capacity power supply units to function properly. Consequently, discrete GPUs also have higher rates of power consumption relative to integrated graphics solutions.

Some modern main circuit boards often include an integrated graphics processing unit as well as one or more additional expansion slots available to add a dedicated graphics unit. Each GPU can and typically does have its own output terminals with one or more ports corresponding to one or more audio/visual standards (e.g., VGA, HDMI, DVI, etc.), though typically only one of the GPUs will be running in the computing system at any one time. Alternatively, other modern computing systems can include a main circuit board capable of simultaneously utilizing two identical dedicated graphics units to generate output for one or more displays.

Some notebook and laptop computers have been manufactured to include two or more graphics processors. Notebook and laptop computers with more than one graphics processing units are almost invariably solutions featuring an integrated GPU and a discrete GPU. Unlike configurations common to desktop computers however, due to size and weight constraints, the discrete graphics processors in mobile computing systems may be non-standardized, and specific to the laptop or notebook's particular make or model. Furthermore, unlike desktop computers featuring multiple graphics processors, mobile computing systems with an integrated GPU and a discrete GPU may share the same output terminals (e.g., the integrated monitor and a single output terminal with one or more ports).

In one embodiment of a notebook computing system having both an integrated GPU as well as a discrete GPU that share the same output terminals, a user is able to select a particular GPU to use, e.g., to perform a certain task or under specific circumstances. Invariably, the two graphics processors will share some displays. For example, at one point in time, the user may prefer lower power consumption and extended battery life, and can opt to use the more energy efficient graphics processing units (e.g., the integrated GPU). Conversely, at some other time the user may prefer performance, and can switch to the higher performance graphics processing units (e.g., the discrete GPU). Traditionally, switching the operating GPU would require a hard reboot of the entire system—a process which can take up to a few minutes to complete, depending on the system. Understandably, this can detract from a user's experience and may not automatically store all of the user's progress after the reboot. Other embodiments may have more than two GPUs, or multiple discrete GPU's, or multiple integrated GPUs.

The problem is exacerbated when multiple displays are also involved during the switch from one GPU to the other. Due to the differences in performance capabilities between the two graphics processing units, a discrete GPU may be capable of producing output at performance levels exceeding that which an integrated GPU is capable of generating. For example, discrete graphics processing units may be able to produce displays at higher settings. These settings may be arranged into pre-set display modes, selectable by a user (typically through an interface) to configure the display produced by the operating GPU. Typically, these settings include a plurality of resolutions, color bit depths and pixel clocks.

Thus, if a discrete GPU generating output at a certain display mode is detached from the corresponding display, is switched to a lower performing integrated GPU incapable of producing displays at the elected display mode, and is later reattached to the display while the integrated GPU is running, the resultant output generated by the GPU and presented in the display may vary significantly between the two GPUs, according to the specific graphics processing units involved. In some cases, a display may not be presented at all. Alternatively, a display may be presented with moderate to severe distortion at a lower resolution. Furthermore, GPUs of different makes and models may use inconsistent algorithms or other operations to calculate or determine supportable display modes. These inconsistencies can result is display modes with slight divergences. Consequently, this may require additional user configuration to be resolved, further negatively impacting the user experience.

SUMMARY

Embodiments of the present invention are directed to provide a method and system for coordinating graphics processing units in a single computing system. A method is described herein that allows users to select between multiple GPUs of a single system while providing a consistent and predictable display experience for the user. A method is also provided which allows for the construction of a list of display modes which may be employed by each of the graphics processing units to configure and present an output in a display device. By creating the list of shared (e.g., compatible) display modes, output displayed in the display device may advantageously provide a consistent graphical experience that persists through the alternate use of two or more graphics processing units in the system.

One novel method builds a list of shared display modes (e.g., modes that are compatible by both GPUs of a system)

by compiling a final list from a GPU specific base mode list with dynamic display modes acquired from an attached display device and validating each of the derived modes on both GPU's. Another novel method provides the ability to generate graphical output configured according to a user-selected display mode that persists when an alternate graphics processing unit in the system is selected and used as the primary operating graphics processing unit to generate graphical output. A novel system includes multiple graphics processing units in the same computing system of varying capabilities which may be selected to drive a shared display device by a multiplexer to correspond to user-selected input or policy to use a specific GPU to generate output in a display device.

Each of the above described novel methods and system feature the ability to provide a persistent graphical environment in which output may be displayed to a user. In short, a user's graphical experience is more consistently and conveniently displayed based on the use of only display settings that are shared capabilities of the graphics processing units in a computer system.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 8 depicts a table of results for a method for validating display modes, in accordance with embodiments of the present invention.

DETAILED DESCRIPTION

Figure 1:
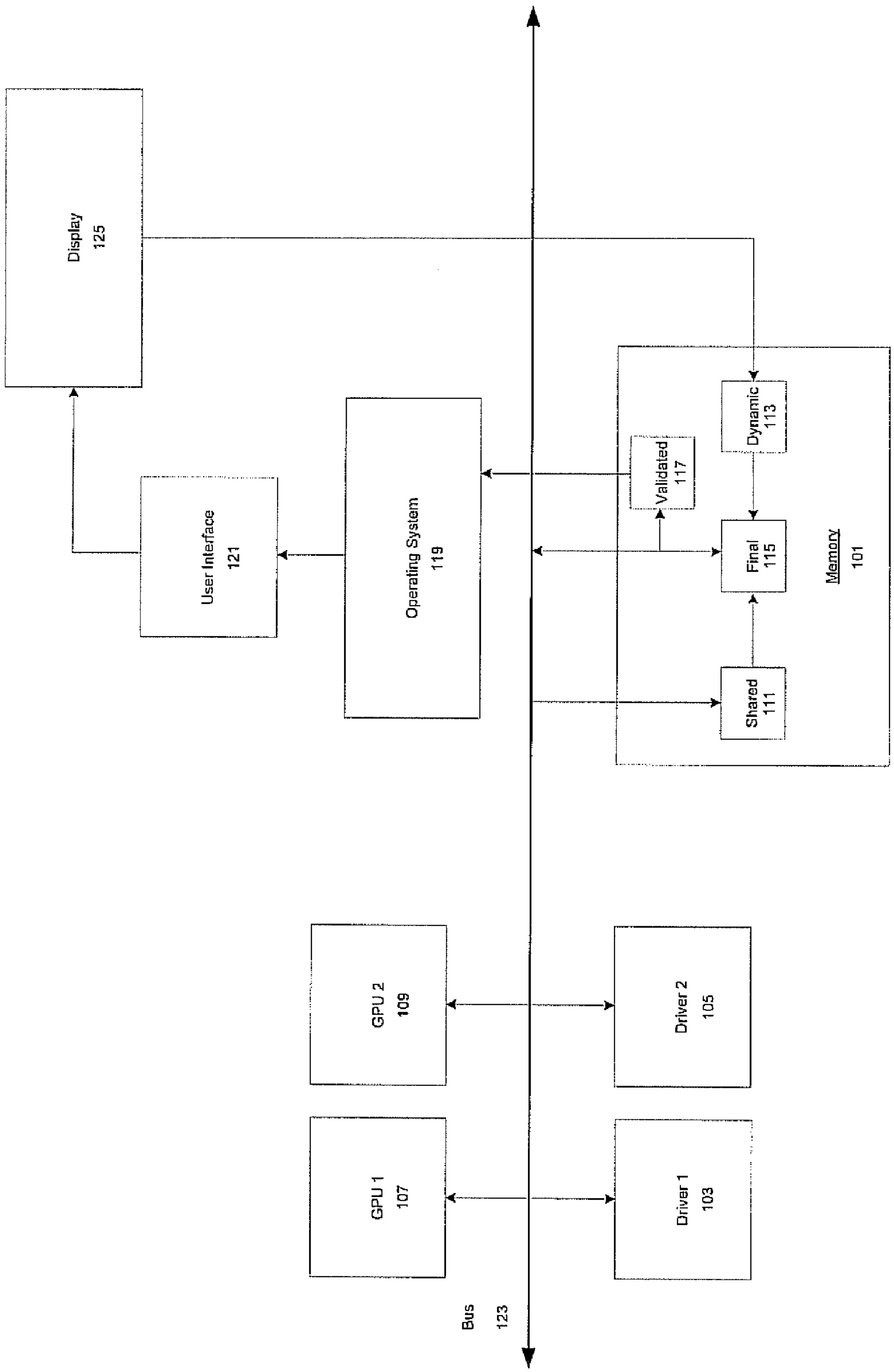
FIG. 1 depicts a data flow diagram of an exemplary computing system, in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 2-6) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Multiple GPU Systems

According to embodiments of the claimed subject matter, a computing system including multiple graphics processing units is provided. A user of the computing system may thus elect one of the graphics processing units to render the graphical output, corresponding to data produced by the computing system, which is then presented in a display device. In a typical embodiment, each of the graphics processing units interacts with the computing system through a driver operating in the computing system and each graphics processing unit has a specific, corresponding driver which communicates with the GPU through a bus in the computing system.

According to some embodiments, each of the graphics processing units may have specific (and possibly disparate) performance capabilities. These capabilities may be expressed as a plurality of characteristics that shape and configure the graphical output of the GPU as it is displayed by the display device. In a typical embodiment, these characteristics may include, but are not limited to, the resolution, pixel clock and bit depth of the output as displayed. In further embodiments, these characteristics are conveyed to the operating system executing on the computing system, whereupon they may be visible and configurable by a user of the computing system.

The set of characteristics may be further organized by, for example, the operating system, into a plurality of discrete display modes. Each display mode may be collected and presented in a list of a graphical user interface (or other such arrangement) to the user, who is able to select one of the display modes to suit the user's needs or preferences. In some embodiments, the selected display mode can be saved for the user, GPU and/or display such that subsequent combinations of the user, the selected GPU, and/or the display device will cause the specific GPU to automatically produce graphical displays according to the display mode. Due to the disparity in performance capabilities however, the list of display modes may not be consistent between all of the GPUs in the system. That is, some display modes may not be offered by the drivers of a GPU as the display mode may exceed the capabilities of that GPU. Consequently, alternating between graphics processing units may sometimes result in inconsistent or distorted displays, or displays presented in non-ideal display modes.

Accordingly, the claimed subject matter is directed to a method and system for dynamically adding and removing display modes coordinated across multiple graphics processing units of a computer system. In one embodiment, the display modes may be coordinated across two or more multiple graphics processing units in a computing system by building a shared list of display modes for each encountered display. This shared list of display modes may include any number of basic supported display modes and dynamically added display modes specific to a display (e.g., monitor) coupled to the computing system. By shared list of display modes, what is meant is the modes of a shared list are compatible with all GPUs of the computer system.

Data Flow Chart

With reference now to FIG. 1, a data flow chart 100 of an exemplary multi-GPU system is depicted, in accordance with one embodiment. In a typical configuration, the multi-GPU system includes a first graphics processing unit (e.g., GPU 1 107), a second graphics processing unit (e.g., GPU 2 109) managed by a first driver (e.g., Driver 1 103) and a second driver (e.g., Driver 2 105), respectively. In one embodiment, Driver 1 103 and Driver 2 105 are executed in a computing system and communicate to their respective graphics processing units GPU 1 107 and GPU 2 109 via a shared Bus 123. In one embodiment, a list of display modes 111 supported by both GPU 1 107 and GPU 2 109 is created and stored in system memory 101. In some embodiments, the creation of the shared mode list is performed by a driver of a graphics processing unit (e.g., Driver 1 103 of GPU 1 107).

A display device 125 may also pass data into the system via the Bus 123 to construct a list of dynamic display modes supported by the display device. In one embodiment, the data from the display device 121 is the EDID of the display device 121. In one embodiment, the list of dynamic display modes 113 supported by the display device is created and stored in system memory.

According to some embodiments, the shared mode list 111 and dynamic mode list 113 created and stored in memory 101 may be combined to form a final mode list 115. The final mode list is communicated via the Bus 123 to the drivers (103, 105) of the graphics processing units (107, 109), whereupon the display modes comprising the final mode list is validated with (e.g., supportable by) the respective driver. Unsupported display modes are culled from the list. The resultant list comprises a validated list 117 of display modes.

In one embodiment, the validated list 117 is passed via the Bus 123 to the Operating System 119 of the system, whereupon the list is presented in a User Interface 119 on the Display Device 125 to the user of the system. The User Interface 119 enables the user to select a display mode from the validated list 117 of display modes. Subsequent graphical output rendered by the active graphics processing unit (e.g., GPU 1 107 or GPU 2 109) is configured to conform to the display mode selected by the user in the User Interface 119.

Constructing Shared Mode List

Figure 2:
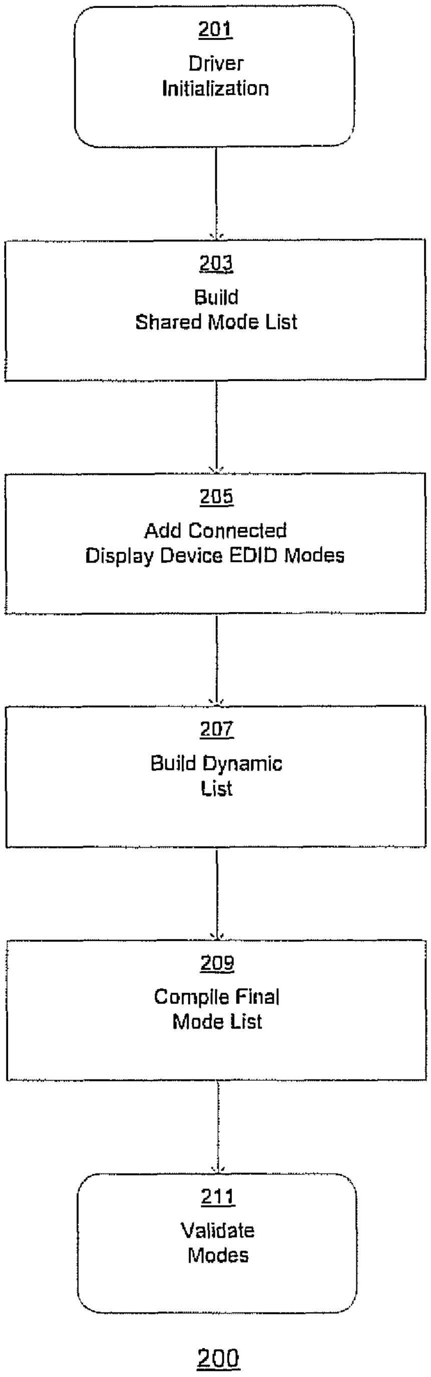
FIG. 2 depicts a flowchart of an exemplary method for constructing a shared mode list, in accordance with embodiments of the present invention.

With reference now to FIG. 2, a flowchart 200 of an exemplary method for constructing a shared mode list is depicted, in accordance with one embodiment. Although specific steps are disclosed in the flowchart 200 (and flowcharts 300, 400, 500 and 600), such steps are exemplary. That is, embodiments of the present invention are well suited to performing various other (additional) steps or variations of the steps recited in flowcharts 200, 300, 400, 500 and 600. It is appreciated that the steps in flowcharts 200, 300, 400, 500 and 600 may be performed in an order different than presented, and that not all of the steps in flowchart flowcharts 200, 300, 400, 500 and 600 may be performed. Steps 201-211 describe exemplary steps comprising the flowchart 200 in accordance with the various embodiments herein described.

As depicted in FIG. 2, initialization for a driver corresponding to a first graphics processing unit is performed at step 201. In one embodiment, the initialization of the driver may result from the computing system's user's election to use the first graphics processing unit for rendering graphical output. This election may be made to suit a particular task or circumstances. For example, a more energy efficient GPU may be selected in order to extend the battery life of a mobile computing system. Alternatively, a higher performing GPU may be selected to execute a particular task which is more demanding (e.g., rendering three-dimensional graphics). In some embodiments, initialization of the driver is performed automatically when the GPU corresponding to the driver is selected by the user.

Once the driver of the current operating graphics processing unit is initialized in step 201, a mode list shared by the graphics processing units in the computing system is constructed at step 203. In one embodiment, a driver for a graphics processing unit is pre-programmed with a plurality of base display modes which the GPU is capable of supporting. Building the shared mode list may therefore comprise, for example, the driver of the currently active GPU sending a request to the drivers of the currently other GPUs for a list of base display modes that the drivers of the other GPUs support; receiving the base display mode list from the drivers of the other GPUs; and comparing the base mode list of the presently operating graphics processing unit with the base mode list(s) received from the drivers of the other graphics processing unit(s).

In one embodiment, a display mode consists of a plurality of timings according to the VESA (Video Electronics Standard Association) standard. According to such embodiments, comparing the base mode lists generated by the drivers of two or more graphics processing units may be performed by comparing the timings for the display modes in each of the base mode lists. It is appreciated that a shared display mode list is subsequently constructed from the display modes which are supported by (e.g., contained in the base mode list of) all of the drivers and/or their corresponding GPUs.

At step 205, the driver of the presently operating graphics processing unit determines a plurality of display modes available to a display device that is communicatively coupled to the presently operating graphics processing unit. These display modes may be determined from display identification information obtained from the display device. In some embodiments, the display identification information comprises the EDID (Extended Display Identification Data) of the display. According to these embodiments, a plurality of display modes for a communicatively coupled display device may be determined by parsing the EDID of the display to determine a plurality of resolutions and/or timings corresponding to display modes supported by the display. In further embodiments, some or all of the display modes may comprise display modes specific to the particular display device.

At step 207, a dynamic display mode list is constructed from the resolutions and/or timings corresponding to display modes supported by the display, as determined in step 205. In one embodiment, a dynamic display mode list may be constructed by: comparing the timings corresponding to the plurality of display modes available to (e.g., supported by) a communicatively coupled display to the shared mode list created in step 203; flagging any of the plurality of display modes available to the coupled display not found in the shared mode list which are also supported by the driver of the presently operating GPU; and, compiling a dynamic mode list from the flagged display modes.

At step 209, a final mode list is compiled by combining the shared mode list created at step 203 with the dynamic mode list constructed at step 207. In one embodiment, the final mode list is compiled simply by appending the dynamic mode list to the shared mode list. In further embodiments, the driver of a presently operating graphics processing unit is capable of providing a clamping feature to optimize the collection and validation of display modes. According to these embodiments, the driver of the presently operating graphics processing unit recognizes the inherent limitations of one or more other graphics processing units in the computing system (e.g., either by directly querying the corresponding drivers or implicitly deducing from the received base mode lists). In a still further embodiment, clamping is performed by automatically removing the display modes in the final mode list exceeding the capabilities of the other graphics processing unit(s).

At step 211, the final mode list as compiled in step 209 is validated with the driver(s) of the other GPU(s). Validation may be performed by, for example, verifying each of the display modes in the final mode list is supported by the active and inactive GPU(s). In one embodiment, validation may be performed by querying the driver(s) of the other GPU(s) whether the display modes in the final mode list are supported. For example, in one embodiment, the validation is performed by individually querying the driver(s) of the inactive GPU(s) with each of the display modes in a sequential order through the list of modes. Alternatively, validation may also be performed by submitting a collection of the final mode list and receiving a collection of responses, whereupon the collection of responses may be parsed and apportioned for the corresponding display modes in the final mode list by the driver of the presently operating graphics processing unit. Upon the completion of step 211, a validated mode list is completed which is maintained in memory.

In alternate embodiments, the mode list that is validated comprises only the dynamic mode list and does not verify the display modes contained in the shared mode list. In still further embodiments, once the mode list (either the final or the dynamic mode list, according to various embodiments) is validated in step 211, the list of validated display modes is sent to the operating system. The operating system in turn may receive the validated list of display modes and present it within an interface to a user to allow the user to select (and store) the preferred display mode for the present task. In this case, the user is allowed to only select from the validated list. Once the user selection has been made, the display mode selection may be stored. In further embodiments, the display mode selection may be stored with additional information, such as, for example, noting the present user account, display device and GPU. If the same display device is subsequently detected (and, according to some embodiments, in combination with the user account), the operating GPU may automatically be configured to generate output to display in the display device according to the last stored display mode.

As the display modes presented to the user include only the display modes supported by all GPUs in the computing system, even if, subsequently, alternate GPUs in the computing system are selected to become the presently operating graphics processing unit, the same display mode may be retained, thus providing a persistent display mode coordination across multiple GPUs in the system. By providing the a persistent display mode coordination across multiple GPUs in a single computing system, the user benefits from a consistent graphical experience while retaining the flexibility to choose an optimal GPU to use for a particular task without ever experiencing display faults.

Adding Display Modes From New Displays

Figure 3:
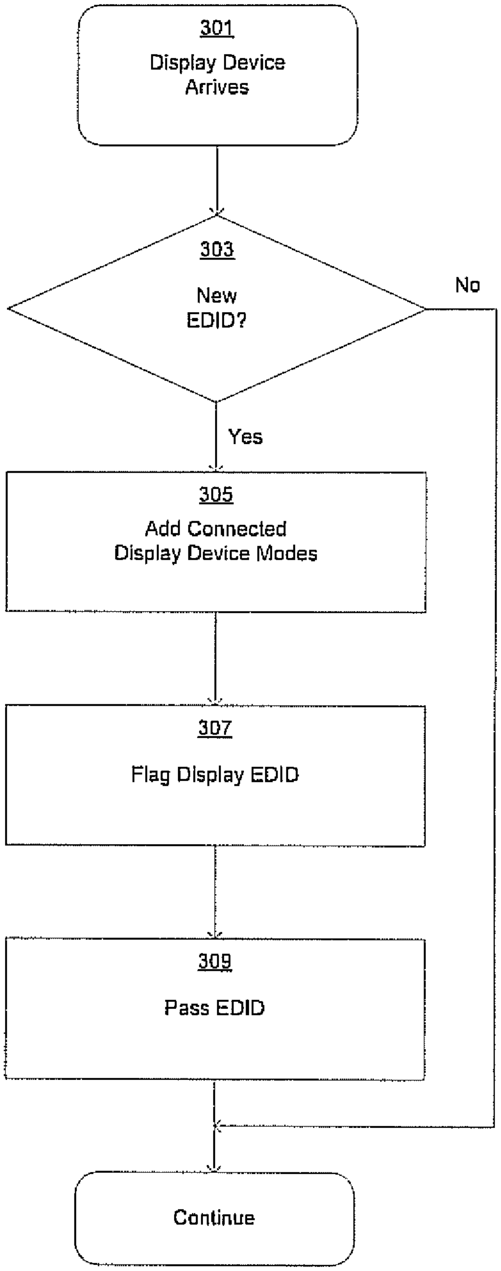
FIG. 3 depicts a flowchart of an exemplary method for appending display modes from a new display with an EDID, in accordance with embodiments of the present invention.

With reference now to FIG. 3, a flowchart 300 of an exemplary method for appending display modes from a new display with an EDID is depicted, in accordance with one embodiment. Steps 301-309 describe exemplary steps comprising the flowchart 300 in accordance with the various embodiments herein described. In one embodiment, flowchart 300 may describe a portion of the specific steps performed during step 205 as described above with reference to FIG. 2.

As depicted in FIG. 3, a display device coupled to a port of a GPU is detected in step 301. In one embodiment, the plurality of graphics processing units in a system may share a single output terminal (e.g., for mobile computing systems). Alternatively, the plurality of graphics processing units may each have a proprietary output terminal. According to some embodiments, detecting the coupling of a display device to a port of a GPU may be performed at any GPU, including inactive GPUs.

According to some embodiments, a display device may already be communicatively coupled to the presently operating GPU. In this case, the display device may be a previously unrecognized display device when the presently operating GPU is initialized. In further embodiments, the newly added display device may replace a currently coupled display device while the computing system is still in operation. This procedure is known as "hot swapping," or "hot plugging." According to these embodiments, the hot-swapped in display device may be detected upon communicatively coupling with a port of the GPU.

Alternatively, a display device may be communicatively coupled to a presently operating GPU that was previously uncoupled to a display device. In still further embodiments, a computing system, such as a mobile computing system, may have an integrated and/or default display device (e.g., the attached laptop or notebook monitor). According to these embodiments, a new display device may also comprise the additional coupling of a display device to a heretofore uncoupled output port of the GPU output terminal.

At step 303, an evaluation of the display device detected at step 301 is made to determine whether the display device is a new display device or a known display device. Determining whether the display device is known may be performed by, for example, obtaining identity information of the display device (e.g., an EDID of the display) and comparing the EDID to a stored list of known EDIDs. In a typical embodiment, if the display device communicatively coupled to the presently operating display device and detected in step 301 is determined to be a known display device, that is, a display device which had been coupled to a graphics processing unit of the computing system and used to display output generated by the coupled GPU at a previous time, the last display mode used by a graphics processing unit of the computing system with the display device is automatically selected and used by the presently operating display device to present graphical output in the display device.

In other words, if the display device is recognized from a previous session in which the device was used with any GPU of the computing system, the presently operating GPU will automatically use the display mode selected during a previous session. If the display device is recognized as a known display, the process ends after the display mode of the previous session is determined and the output of the GPU is configured to conform to the display mode.

Alternatively, if the display device communicatively coupled to the presently operating display device detected in step 301 is determined to be a new display device, the display modes supported by the display device are collected as the dynamic mode list by the driver of the presently operating display device in step 305. Subsequently, the dynamic mode list obtained from the newly added display device may be aggregated with the base mode list (as described above with reference to step 205 of FIG. 2).

At step 307, the EDID (or other identity data) of the newly attached display is flagged as a new EDID, and subsequently passed to the driver(s) of the dormant GPU(s) in the system at step 309. By flagging the new EDID and passing the EDID to the driver(s) of the dormant GPU(s) in the system, the drivers of the dormant GPUs are able to perform operations according to potentially driver-specific algorithms to obtain corresponding display modes from the display device, which may be used subsequently for validation and coordination.

Initiating Validation

Figure 4:
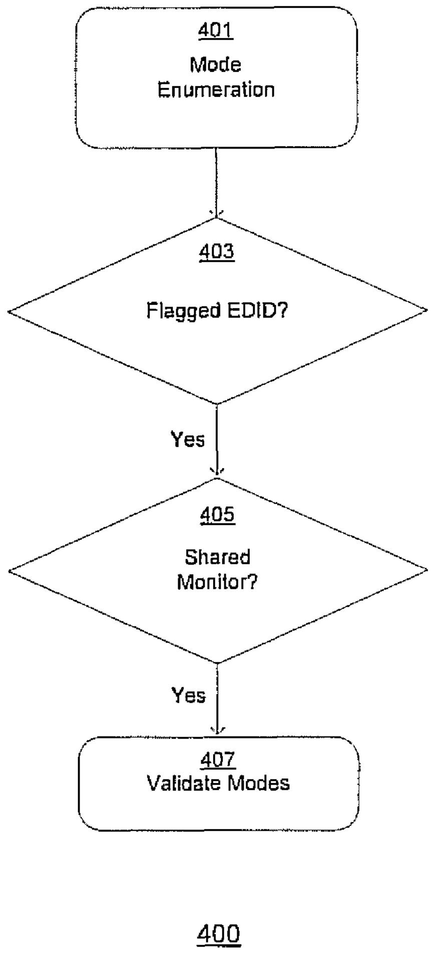
FIG. 4 depicts a flowchart of an exemplary method to initiate a validation of a dynamic mode list is depicted, in accordance with embodiments of the present invention.

With reference now to FIG. 4, a flowchart 400 of an exemplary method to initiate a validation of a dynamic mode list is depicted, in accordance with embodiments of the present invention. Steps 401 to 407 describe exemplary steps comprising the flowchart 400 in accordance with the various embodiments herein described.

In one embodiment, flowchart 400 describes the steps performed by the driver of the presently operating graphics processing unit in response to detecting the coupling of a display device and prior to initiating a display mode validation procedure with a driver of another graphics processing unit in the same computing system. As depicted in FIG. 4, at step 401, a mode enumeration is performed in the driver of the presently operating graphics processing unit. In one embodiment, mode enumeration may consist of, for example, parsing the identity information of the display device (e.g., the EDID of the display device) and determining display modes supported by the display device. These display modes are subsequently collected and arranged to form a dynamic mode list. In a further embodiment, mode enumeration may include, for example: purging the dynamic mode list and removing any display modes duplicated in the shared base mode list or any display modes that exceed the known capabilities of the other GPUs (e.g., performing clamping).

At step 403, an evaluation of the identity information of the display device is made to determine whether the display device is a new, previously unknown display device. In some embodiments, the display device may have been flagged at an earlier step in the process (e.g., step 303 of the flowchart 300 as depicted in FIG. 3) to identify the display device as a new display device. According to these embodiments, evaluation of the identity information simply comprises determining if the identity information is flagged. If an evaluation of the identity information of the display device made during step 403 determines that the display device is a new display device, the process proceeds to step 405. Otherwise, the display device is determined to be a known display and a display mode may be used to configure output to be displayed in the display device according to a prior usage of the display device.

At step 405, if the display device is determined in step 403 to be a new display device, a further evaluation is made to determine if the display device is a shared display device. In one embodiment, multiple GPUs in the same system may share a single output terminal, which the GPUs are communicatively coupled to via a hybrid interposer or multiplexer. In further embodiments, one or more of the GPUs in the system may also have its own discrete output terminal which may be configured to output according to standards unsupported by the shared output terminal. For example, a shared output terminal may offer ports corresponding to VGA, S-video, and DVI standards, and a discrete terminal for one of the GPUs may provide a port corresponding to the HDMI standard. According to these embodiments, the discrete terminal may be exclusive to the corresponding (typically discrete) GPU. Thus, determining if the display device is a shared display device may comprise, according to these embodiments, detecting the display device in a port of the shared output terminal. Likewise, if the display device is detected in a port of a discrete output terminal, the display device is determined to not be a shared display device. If the display device is determined to be a shared display device, the process proceeds to step 407.

Finally, at step 407, the dynamic mode list is validated with the driver(s) of the other GPU(s) in the system. Validating the mode list may be performed as described with reference to step 211 of FIG. 2, provided above.

Removing Display Device

Figure 5:
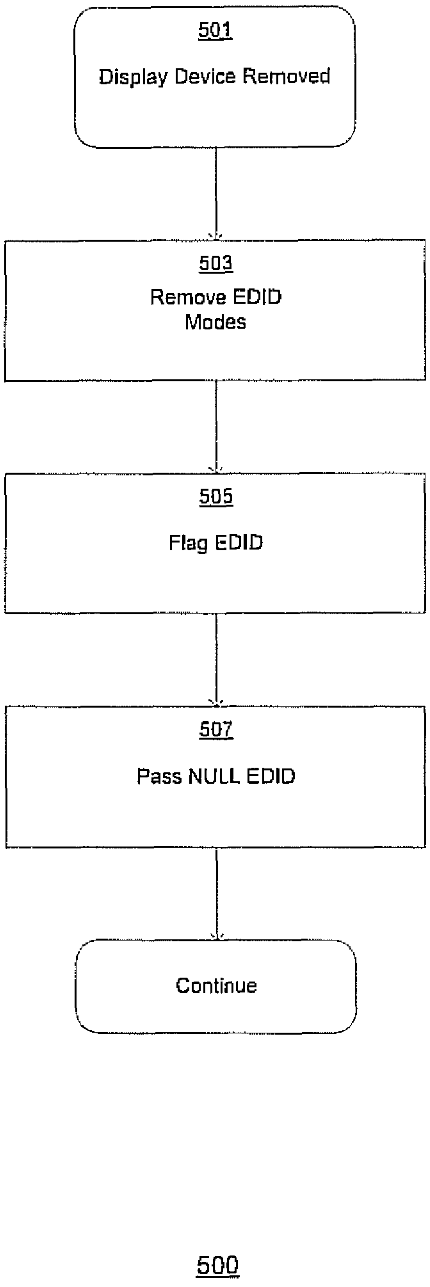
FIG. 5 depicts a flowchart of an exemplary method for removing display modes when a display device is removed, in accordance with embodiments of the present invention.

FIG. 5 depicts a flowchart 500 of an exemplary method for removing display modes when a display device is removed, in accordance with embodiments of the present invention. Steps 501 to 507 describe exemplary steps comprising the flowchart 400 in accordance with the various embodiments herein described.

In one embodiment, flowchart 500 describes the steps performed by the driver of the presently operating graphics processing unit in response to detecting the removal of a display device. Once a display device is removed, the display modes specific to the display device (as determined in step 205 of FIG. 2 above) may no longer be valid in the system. That is, a subsequent display device may not support display modes of the last display device. As depicted in FIG. 5, at step 501, the removal of the display device from a port corresponding to a graphics processing unit is detected. In one embodiment, the removal of the display device may comprise decoupling a display device from a port of a shared output terminal (e.g., the interposer) corresponding to more than one graphics processing unit. According to these embodiments, the process performed according to flowchart 500 may not include the removal of a display device from a discrete output terminal specific to one GPU.

At step 503, the display modes specific to the de-coupled display device are removed from the final mode list by the driver of the presently operating display device. Removing the display modes may comprise, for example, removing the display modes corresponding to the EDID of the de-coupled display device.

At step 505, the EDID of the de-coupled display device is flagged to notify the driver(s) of the other GPU(s) in the system that the display device is no longer coupled and the display modes specific to the EDID of the display device may no longer be valid. This is followed by passing a simulated EDID having a null value at step 507 to the driver(s) of the other GPU(s).

According to some embodiments, a display device may not have an EDID. For example, older displays, such as Cathode Ray Tube (CRT) displays often do not arrange their display identity information in standardized EDID form. Accordingly, for these embodiments, rather than passing a simulated EDID having a null value, a null pointer without values is passed to the driver(s) of the other GPU(s) at step 507 to indicate the decoupling of the display device.

Unsupported Display Modes

Figure 6:
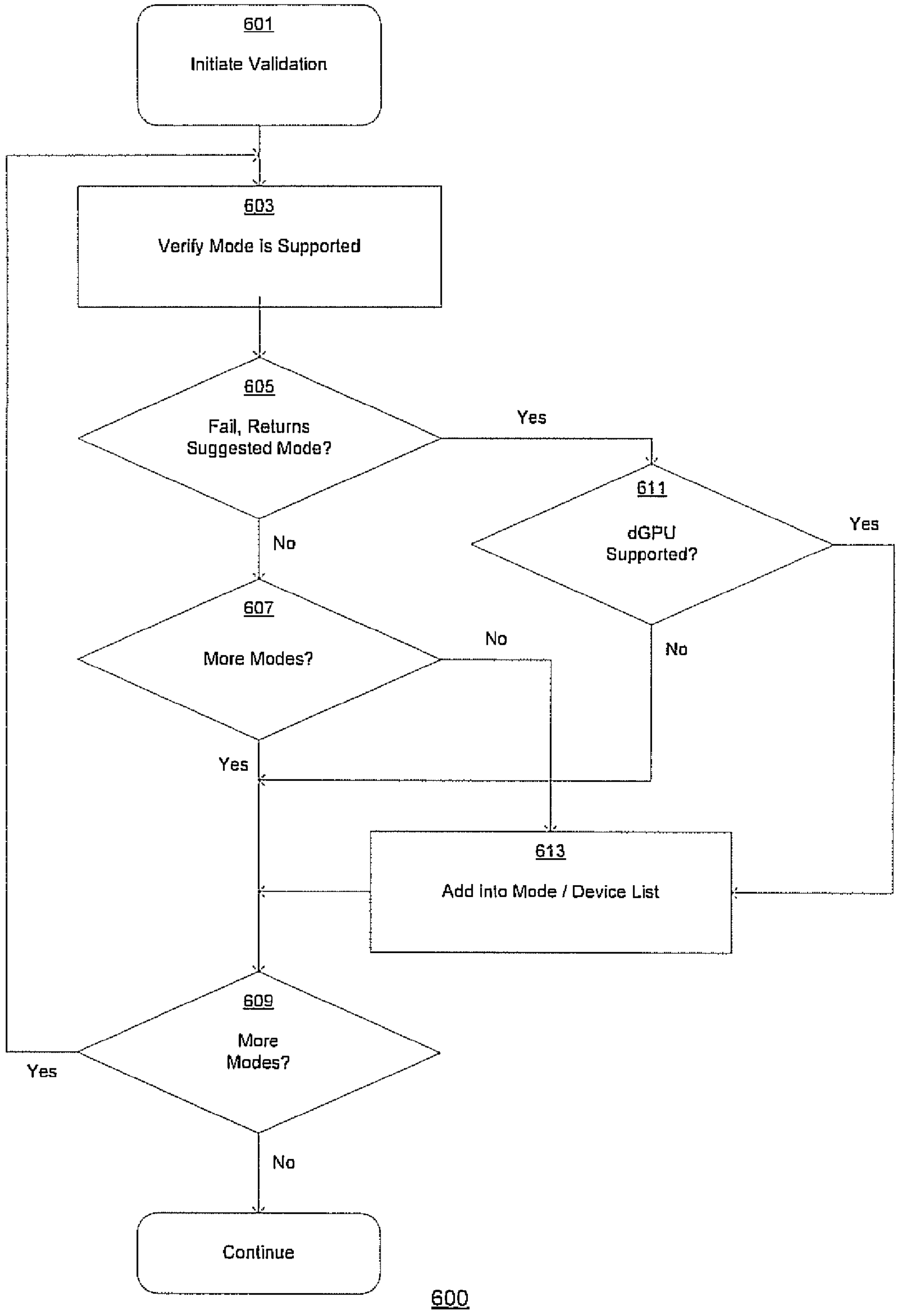
FIG. 6 depicts a flowchart of an exemplary method for validating display modes from a new display, in accordance with embodiments of the present invention.

With reference now to FIG. 6, a flowchart 600 of an exemplary method for validating display modes from a new display is depicted, in accordance with one embodiment. Steps 601-613 describe exemplary steps comprising the flowchart 600 in accordance with the various embodiments herein described. In one embodiment, flowchart 600 may describe a portion of the specific steps performed during step 211 as described above with reference to FIG. 2.

As depicted in FIG. 6, validation of a final mode list is initiated in step 601. In one embodiment, the final mode list may comprise both a shared base mode list and a dynamic mode list including display modes specific to a display device coupled to a graphics processing unit through a port of a shared output terminal. In alternate embodiments, the final mode list may comprise only the dynamic mode list. According to some embodiments, validating may be performed by the driver of a presently operating GPU in a computing system with two or more GPUs.

At step 603, the validation process initiated in step 601 is continued by verifying a display mode in the final mode list is supported by the driver(s) of the other GPUs in the system. Verifying a display mode with the driver(s) of the other GPUs in the system may comprise, for example, querying the driver with the timings or other parameters of the display mode. In one embodiment, verification of the final mode list with the other GPU(s) in the system may be performed by, for example, querying the other driver(s) of the other GPU(s) in the system with each display mode in the final mode list individually in sequential order to determine if the display mode is supported by the corresponding driver.

At step 605, the response to the verification query of the display mode sent at step 603 is received from a driver of an other GPU. If the display mode queried at step 603 is supported by the other driver, the display mode may be retained in the final mode list. In one embodiment, if the display mode queried at step 603 is not supported by a driver of another GPU, the driver may return a suggested display mode that is supported by the other driver that most approximates the queried display mode, and the process proceeds to step 611. Alternatively, if the display mode queried at step 603 is not supported by the driver of the other GPU and the driver does not support an approximate display mode or otherwise does not suggest a display mode to replace the display device specific display mode, the process proceeds to step 607.

At step 607, a further evaluation is made to determine whether there are any more display modes left to be validated in the final mode list. If there are no other display modes remaining in the final mode list which are as of yet unverified, the process proceeds to step 613, and the display modes specific to the device which were verified in step 603 to be supported by the driver of the other GPU are retained in the final mode list and the display modes which were unsupported by either the driver of the presently operating GPU and/or the driver(s) of the other GPU(s) are purged from the final mode list. Alternatively, if there are more display modes remaining in the final mode list, the process proceeds to step 609, wherein the other display modes in the final mode list that are left unverified are verified with the driver(s) of the other GPU(s) according to the pre-determined manner (e.g., sequential order).

At step 611, a suggested display mode supported by the target driver of the display mode query performed at step 603 is validated with the driver of the presently operating graphics processing unit. According to some embodiments, the suggested display mode is a display mode supported by the target driver that most approximates the display mode in the final mode list (alternatively, the dynamic mode list) queried at step 603. As depicted, the discrete GPU is the presently operating graphics processing unit in an exemplary configuration. Validating the suggested display mode may comprise, for example, receiving a plurality of timings corresponding to a display mode from the target driver and evaluating the timings to determine if the display mode is supported by the discrete GPU. If the display mode is supported, the suggested display mode is added to the final mode list at step 613. Alternatively, if the display mode is not supported, the process proceeds to step 609, whereupon the next display mode (if any) are processed according to the flowchart 600.

In another embodiment, the discrete GPU may be inactive while the integrated GPU is connected to a shared display. At a prior time, e.g., when the display device arrives and is detected by the active integrated GPU, the integrated GPU will signal to the discrete GPU of the Hot-Plug attach event (typically, through a specific interface). The signal causes the discrete GPU to query the attached display EDID from the integrated GPU and call into the integrated GPU with modes to be validated as if the discrete GPU had received the Hot-Plug while active. The Mode Validation process is repeated as if the discrete GPU had received the Hot-Plug event while active. Meaning that the discrete GPU will request base modes and/or extract modes from the EDID and/or call the integrated GPU driver to validate each mode. This process is performed after Hot-Plug and before the integrated GPU enumerates modes to the operating system, thereby ensuring that the integrated GPU only enumerate the modes supported by both GPU's.

In an alternate embodiment, the integrated GPU may call the discrete GPU to request mode validation via a reverse validation interface that allows the integrated GPU to pass modes to the discrete GPU for confirmation before enumeration.

Exemplary Computing System

Figure 7:
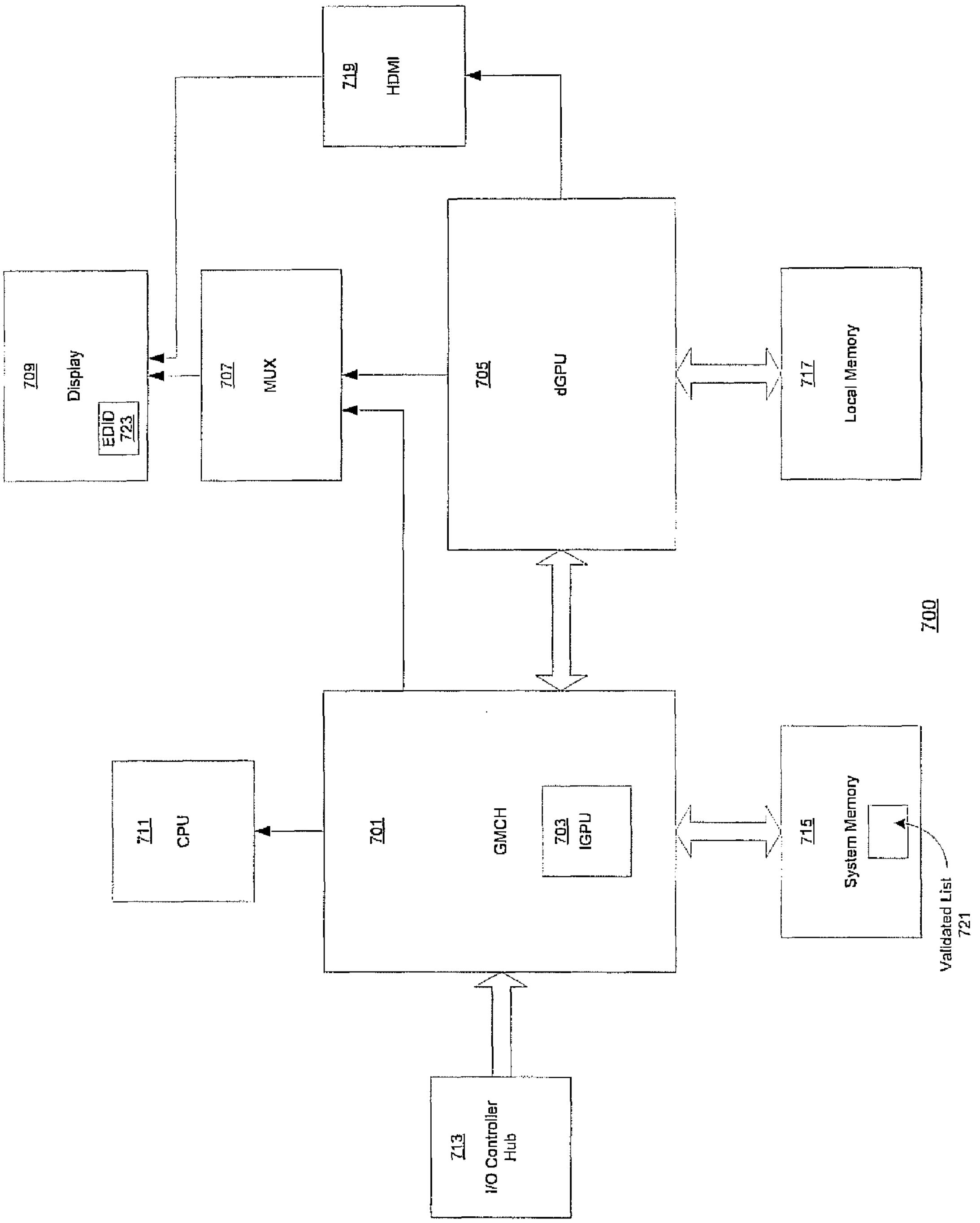
FIG. 7 depicts a block diagram of an exemplary computing system, in accordance with embodiments of the present invention.

With reference to FIG. 7, a block diagram of an exemplary computer system 700 is shown. It is appreciated that computer system 700 described herein illustrates an exemplary configuration of an operational platform upon which embodiments may be implemented. Nevertheless, other computer systems with differing configurations can also be used in place of computer system 700 within the scope of the present invention. That is, computer system 700 can include elements other than those described in conjunction with FIG. 7.

It is understood that embodiments can be practiced on many different types of computer system 700. Examples include, but are not limited to, desktop computers, workstations, servers, media servers, video game consoles, laptops and notebooks, as well as other electronic devices with computing and graphical production capabilities.

As presented in FIG. 7, an exemplary system for implementing embodiments includes a general purpose computing system environment, such as computing system 700. In its most basic configuration, computing system 700 typically includes at least one processing unit 711 and memory 715. Depending on the exact configuration and type of computing system environment, memory 715 may be volatile (such as RAM), non-volatile (such as ROM, flash memory, etc.) or some combination of the two. Computer system 700 also comprises a north bridge 701 for handling communications between the processor 711, memory 715 and graphics processing units. In further embodiments, the north bridge comprises a graphics and memory controller hub (GMCH) 701 with an integrated graphics processing unit 703. In still further embodiments, the computing system also comprises one or more discrete graphics processing units 705, each with a dedicated local memory 717. In one embodiment, drivers for each of the graphics processing units 703, 705 may be executed from system memory 715.

In one embodiment, both the integrated graphics processing unit 703 and the discrete graphics processing unit 705 are coupled to a multiplexer 707, which may be configurable from user input to select one of the inputs from one of the integrated graphics processing unit 703 and the discrete graphics processing unit 705 to present information to the computer user, e.g., by displaying information on an attached display device 709 through a single shared output terminal. Alternatively, one or more GPUs may have discrete output terminals capable of coupling alternate outputs 719 to the display. In one embodiment, the outputs 719 include one or more ports for a plurality of video standards, which may include, for example, VGA, S-video, DVI or HDMI. In further embodiments, the outputs 719 may include one or more standards not provided by the shared output terminal.

Additionally, computing system 700 may also have additional features/functionality. For example, computing system 700 may also include additional peripheral devices including, but not limited to, removable and/or non-removable storage such as magnetic or optical disks or tape; alphanumeric input devices; an cursor control or directing device; and one or more signal communication interfaces (input/output devices, e.g., a network interface card). In one embodiment, alphanumeric input device is configured to communicate information and command selections to central processor 711. Cursor control or directing device may be used for communicating user input information and command selections to central processor 711. Signal communication interface (input/output device) can be a serial port. A communication interface may also include wireless communication mechanisms, which computer system 700 may use to communicatively couple to other computer systems over a communication network such as the Internet or an intranet (e.g., a local area network), or can receive data (e.g., a digital television signal). Each of these enumerated additional peripheral devices may be coupled to, and communicated with, the south bridge (e.g., I/O Controller Hub 713) of the computing system 700.

In one embodiment, a plurality of display modes may be presented to the user of the computing system 700 in display 709. The plurality of display modes may, in one embodiment, comprise the display modes supported by both graphics processing units as well as the display modes specific to the display 709 obtained by the EDID 723 of the display 709. According these embodiments, the display modes may be stored in a list (e.g., validated list 721) within the system memory 715. User input received through an alphanumeric input device or cursor control or directing device coupled to the I/O Controller Hub 713 may be processed to select a specific display mode and/or elect a particular graphics processing unit to generate graphical output. When a particular graphics processing unit is elected, the multiplexer 707 outputs the output generated by the selected GPU and presents the output in the display 709. According to one embodiment, the display mode last used prior to a change in selected GPUs is retained. Accordingly, by retaining the display mode through alternating GPU selections, a consistent user experience is advantageously achieved and presented in the display 709.

FIG. 8 depicts a table of results 800 for a method for validating display modes, in accordance with embodiments of the present invention. As presented, the table of results 800 displays the instances of a multiple graphics processing unit system and whether a timing (e.g., display mode) is enumerated to the operating system of the computing device based upon whether the display mode is supported by the integrated GPU and/or the discrete GPU. Thus, as presented in the table 800, the timings supported by both the integrated GPU (iGPU) and the discrete GPU (dGPU) are enumerated to the operating system as supported. When a timing is unsupported by one or both GPUs, the timing is reported to the operating system as unsupportable. According to some embodiments, an unsupportable timing is not presented to the user as an selectable option to configure the display with.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a mode list, the method comprising:

building a shared mode list comprising a plurality of display modes compatible with both a driver of a first GPU, and a driver of a second GPU;

determining a plurality of display modes available to a first display communicatively coupled to said first GPU;

constructing a dynamic mode list, the dynamic mode list comprising a plurality of display modes available to said first display not already comprised in the shared mode list;

compiling a final mode list comprising a combination of the dynamic mode list and the shared mode list; and validating the final mode list with the second GPU.

2. The method according to claim 1, wherein, said sending, said building, said determining, said constructing and said compiling are performed by said driver of said first GPU.

3. The method according to claim 1 wherein, said sending, said building, said determining, said constructing, said compiling, and said validating are performed automatically by said driver of said first GPU when said first GPU is loaded.

4. The method according to claim 1, wherein said building a shared mode list comprises:

sending a request from said first GPU to said second GPU for a second base mode list comprising a plurality of display modes corresponding to a driver of a second GPU;

receiving said second base mode list from said second GPU;

comparing said second base mode list to a first base mode list comprising a plurality of display modes compatible with both a driver of a first GPU; and collecting said display modes comprised in both said first base mode list and said second base mode list.

5. The method according to claim 1, wherein said validating the final mode list comprises:

verifying said plurality of display modes comprised in said final mode list is supported by said second GPU;

receiving a suggested display mode if a display mode of said plurality of display modes comprised in said final mode list is not supported by said second GPU;

evaluating if said suggested display mode is supported by said first GPU; and adding said suggested display mode to said third mode list if said suggested display mode is supported by said first GPU and said second GPU.

6. The method according to claim 1, further comprising:

sending said final mode list to an operating system executing on said computing system.

7. The method according to claim 1, wherein said determining a plurality of display modes available to said first display comprises:

obtaining display identity information of said first display; and parsing said display identity information of said first display for timings corresponding to a plurality of display modes specific to said first display.

8. The method according to claim 1, wherein said constructing said second mode list comprises:

comparing said plurality of display modes available to a first display to said shared mode list;

flagging any of said plurality of display modes available to a first display not comprised in said shared mode list; and compiling said dynamic mode list from said plurality of display modes specific to a first display flagged.

9. The method according to claim 1, wherein constructing a dynamic mode list comprises:

detecting an addition of a second display to said computing system;

determining whether said second display has been communicatively coupled to said first GPU or said second GPU during a previous session; and producing a display in said second display comprising a display mode consistent with a last display mode used during said previous session if said second display has been communicatively coupled to said first GPU or said second GPU.

10. The method according to claim 9, wherein said determining whether said second display has been communicatively coupled to said first GPU or said second GPU during a previous session further comprises:

determining said second display comprises a new display;

determining the second display comprises a new EDID;

obtaining said new EDID from said second display communicatively coupled to said first GPU or said second GPU;

parsing said new EDID for timings corresponding to a plurality of display modes specific to said second display;

adding said plurality of display modes specific to said second display to said final mode list;

flagging said new EDID;

sending said new EDID to said second GPU; and validating said final mode list.

11. The method according to claim 9, wherein said determining whether said second display has been communicatively coupled to said first GPU or said second GPU during a previous session further comprises:

determining said second display comprises a new display;

determining the second display does not comprise a new EDID;

creating a simulated EDID corresponding to said new display;

sending said simulated EDID to said second GPU; and validating said final mode list.

12. The method according to claim 1, the method further comprising:

detecting a detachment of a second display to said computing system;

flagging an EDID of said second display; and sending an invalid EDID to said second GPU to signal said detachment.

13. The method according to claim 1, wherein said validating said final mode list with said second GPU comprises validating only a portion of said final mode list comprising said dynamic mode list with said second GPU.

14. The method according to claim 1, wherein said validating said final mode list with said second GPU comprises:

referencing a plurality of capabilities of said second GPU;

clamping said final mode list at said plurality of capabilities of said second GPU; and validating a plurality of display modes comprised in said final mode list that do not exceed said plurality of capabilities of said second GPU.

* * * * *